US012576487B2

(12) United States Patent
Miller et al.

(10) Patent No.: US 12,576,487 B2
(45) Date of Patent: Mar. 17, 2026

(54) POWER TOOL

(71) Applicant: Black & Decker Inc., New Britain, CT (US)

(72) Inventors: Kristen E. Miller, Baltimore, MD (US); Kevin M. Alston, Baltimore, MD (US); Benjamin J. Wulker, Westerville, OH (US)

(73) Assignee: BLACK & DECKER INC., New Britain, CT (US)

( * ) Notice: Subject to any disclaimer, the term of this patent is extended or adjusted under 35 U.S.C. 154(b) by 348 days.

(21) Appl. No.: 17/653,896

(22) Filed: Mar. 8, 2022

(65) Prior Publication Data

US 2023/0286117 A1 Sep. 14, 2023

(51) Int. Cl.
*B25B 21/00* (2006.01)

(52) U.S. Cl.
CPC .................................... *B25B 21/00* (2013.01)

(58) Field of Classification Search
CPC ..... B25B 13/46; B25B 13/461; B25B 13/481; B25B 21/00; B25B 21/002; B25B 21/004; B25B 23/0028; B25B 23/147; B25B 27/00; B25B 27/02; B25F 3/00; B25F 5/00; B25F 5/02; H02K 23/66; H02H 7/0854; H02H 7/0858
See application file for complete search history.

(56) References Cited

U.S. PATENT DOCUMENTS 4,523,116 A 6/1985 Dibbern et al.
4,581,499 A 4/1986 Cousins
4,587,384 A 5/1986 Yacobi
4,678,871 A 7/1987 Wong
4,772,765 A 9/1988 Markle et al.
5,089,729 A 2/1992 Moores
5,138,243 A 8/1992 Kress et al.
5,154,242 A 10/1992 Soshin et al.
5,251,706 A 10/1993 Evans
5,440,215 A 8/1995 Gilmore
5,550,416 A 8/1996 Fanchang et al.
5,563,482 A 10/1996 Shaw et al.
5,955,802 A 9/1999 Karasa et al.
6,199,642 B1 3/2001 Becker et al.
(Continued)

FOREIGN PATENT DOCUMENTS

CN 2145907 * 11/1993
DE 3103286 A1 8/1982
(Continued)

OTHER PUBLICATIONS

Prior Art Skil Rechargeable 4V Cordless Screwdriver with Circuit Sensor Technology, https://www.amazon.com/Rechargeable-Cordless-Screwdriver-Circuit-Technology/dp/B07C4916LS, accessed Mar. 7, 2022.

(Continued)

*Primary Examiner* — Robert J Scruggs

(74) *Attorney, Agent, or Firm* — Womble Bond Dickinson (US) LLP

(57) ABSTRACT

A screwdriver including an output member, a motor configured to selectively drive the output member, a battery and an actuation collar. The actuation collar is movable in a forward direction towards the output member to actuate the screwdriver.

20 Claims, 8 Drawing Sheets

(56) References Cited

U.S. PATENT DOCUMENTS

| | | | | |
|---|---|---|---|---|
| 6,424,799 | B1 | 7/2002 | Gilmore | |
| 6,479,958 | B1 | 11/2002 | Thompson et al. | |
| 7,836,968 | B2 | 11/2010 | Steverding et al. | |
| 8,143,547 | B2 | 3/2012 | Yoshikawa | |
| 8,193,458 | B2 | 6/2012 | Hozumi et al. | |
| 8,230,942 | B2 * | 7/2012 | Steverding | B25B 21/00 173/1 |
| 8,716,962 | B2 | 5/2014 | Pusateri et al. | |
| 9,138,128 | B2 | 9/2015 | Teichtmann | |
| 9,278,437 | B2 | 3/2016 | Rakaczki et al. | |
| 9,768,713 | B2 | 9/2017 | Koizumi et al. | |
| 2009/0114067 | A1 * | 5/2009 | Berg | B25B 23/15 81/468 |
| 2010/0065293 | A1 | 3/2010 | Lohr | |
| 2011/0073342 | A1 | 3/2011 | Gilsdorf et al. | |
| 2013/0161039 | A1 * | 6/2013 | Rakaczki | B25F 5/02 173/15 |
| 2021/0069888 | A1 * | 3/2021 | Hairul | H01H 9/06 |
| 2021/0146512 | A1 | 5/2021 | Andersson | |
| 2021/0187723 | A1 | 6/2021 | Andersson | |
| 2022/0266439 | A1 * | 8/2022 | Achterberg | H01M 50/247 |

FOREIGN PATENT DOCUMENTS

| | | | | |
|---|---|---|---|---|
| DE | 20201210411 | U1 | 1/2013 | |
| EP | 1998934 | B1 | 7/2013 | |
| EP | 3238880 | B1 | 12/2021 | |
| GB | 2404891 | A | 2/2005 | |
| WO | WO-2019105097 | A1 * | 6/2019 | B25B 21/00 |

OTHER PUBLICATIONS

Prior art Black + Decker BD40 Screwdriver, https://hello.blackanddecker.ae/bd40-screwdriver/, accessed Mar. 7, 2022.

Skil SD561201 Owner's Manual—4v rechargeable screwdriver with circuit sensor technology, manual copyright date Feb. 2018; https://www.manualslib.com/manual/1459283/Skil-Sd561201.html?page=2#manual, accessed Jul. 8, 2024; screwdriver believed to be listed available for sale at least as early as 2018.

Black+Decker BD40 Instruction Manual—4v max lithium ion cordless screwdriver, screwdriver believed to be available for sale prior to 2022; https://www.manualslib.com/manual/1855853/BlackPlusdecker-Bd40.html#manual, accessed Jul. 8, 2024.

* cited by examiner

POWER TOOL

FIELD OF THE INVENTION

The present invention relates to power tools such as a screwdriver.

BACKGROUND

There are various existing battery powered tools. The prior art tools are actuated in various ways. For example, FIG. 14 illustrates a power tool in the form of a battery powered wrench 110. The wrench 110 has a collar 130 that is biased forward and may be pulled rearward to actuate the tool. Pulling the collar 130 backward "B" may actuate the tool by actuating a microswitch or magnetic switch, upon which the motor is activated to drive an output member. The collar 130 is pulled in a rearward direction and the collar does not determine or adjust a direction of the output.

It is desired to provide a powered tool with an improved construction.

SUMMARY

According to one aspect, there is an exemplary embodiment of a power tool in the form of a screwdriver. The screwdriver includes an output member, a motor configured to selectively drive the output member, a battery and an actuation collar. The actuation collar is movable in a forward direction towards the output member to actuate the screwdriver.

The screwdriver may further include a nosepiece between the collar and the output member.

The screwdriver may further include a circuit board disposed in the nosepiece.

The screwdriver may further include an actuator on the circuit board, wherein movement of the actuation collar in the forward direction causes actuation of the actuator.

The actuator may be a microswitch.

The collar may further include a projection configured to selectively contact the actuator.

The collar may be rotatable to at least three positions.

The at least three positions may include a lock-off position, a forward operation position and a reverse operation position.

According to one aspect, there is an exemplary embodiment of a power tool including a body, a motor housed in the body, a power source, an output member selectively driven by the motor, and an actuation collar configured to actuate the power tool.

The actuation collar may be rotatable between a forward operation position and a reverse operation position.

In the forward operation position, the actuation collar may be slidable in a forward direction towards the output member and the power tool is actuated to drive the output member in forward rotation.

In the reverse operation position, the actuation collar may be slidable in the forward direction in order to and the power tool is actuated to drive the output member in reverse rotation.

The actuation collar may be biased away from the forward direction.

The power tool may further include a forward operation actuator and a reverse operation actuator.

The forward operation actuator may be actuated when the actuation collar is slid forward when in the forward operation position.

The reverse operation actuator may be actuated when the actuation collar is slid forward when in the reverse operation position.

The forward operation actuator and the reverse operation actuator may be microswitches.

The power tool may further include a nosepiece between the body and the output member.

The power tool may further include a circuit board disposed in the nosepiece.

The power tool may further include at least one actuator mounted on the circuit board.

The at least one actuator may further include a forward operation actuator and a reverse operation actuator The forward operation actuator may be actuated when the actuation collar is slid forward when in the forward operation position.

The actuation collar may also be rotatable to a lock-off position.

According to another aspect, there is an exemplary embodiment of a power tool including a handle, a motor, a power source, and an output member selectively driven by the motor.

An actuation collar may be movable in a forward direction towards the output member to actuate the power tool.

The collar may be rotatable to at least three positions.

The at least three positions comprise a lock-off position, a forward operation position and a reverse operation position.

DETAILED DESCRIPTION OF EXEMPLARY EMBODIMENTS

Figure 1:
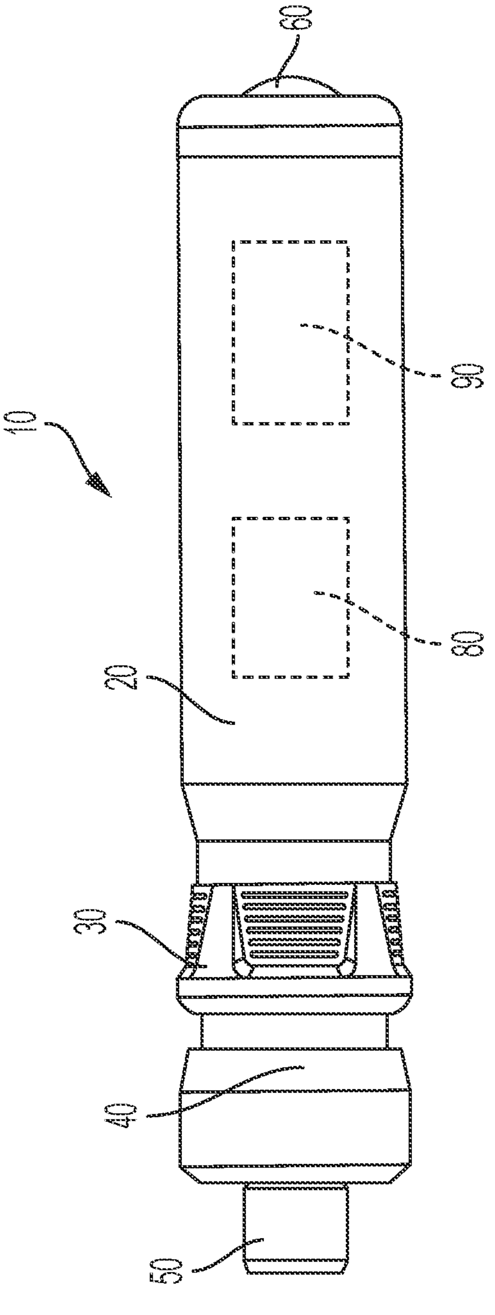
FIG. 1 illustrates a perspective view of an exemplary embodiment of a screwdriver according to the present application.

FIG. 1 illustrates a side view of a non-limiting, exemplary embodiment of a screwdriver 10. The screwdriver 10 includes a body portion 20. The body portion may serve as a handle which a user can grasp so as to hold the screwdriver 10. A motor 80 and a battery 90 are housed in the body portion 20. The battery 90 may consist of a single battery cell or multiple battery cells and may charged by conventional means. The body portion 20 may also house other components, such as a printed circuit board (PCB) on which a controller such as a microprocessor may be mounted.

The screwdriver 10 further includes a collar 30 for actuating the screwdriver 10, a nosepiece 40 and a bit holder 50. The bit holder 50 may be a hexagonal bit holder configured to hold a hexagonal screwdriver bit. In other embodiments, the output may be something other than a hexagonal bit holder. For example, the output may be a chuck. In other embodiments, the tool may be something other than a screwdriver and the output may vary accordingly. For example, the collar 30 and other features may be applied to a rotary tool and the output member would then be a rotary tool chuck for holding rotary tool accessories. Similarly, the collar and other features of the exemplary embodiment may be applied to a wrench and the output member be modified accordingly.

The screwdriver 10 further includes a rotary dial 60. The rotary dial 60 may be used to control the speed and/or a torque limit of the screwdriver 10. The rotary dial 60 may have a variety of settings, such as six settings from a to f. Each of the six settings may represent a speed for the screwdriver 10 or a maximum torque. In some embodiments, the screwdriver 10 may be configured such that it has two modes—a first mode in which the rotary dial 60 sets a speed and a second mode in which the rotary dial sets a maximum torque. There may be more or fewer than six settings.

The collar 30 is biased in a rearward direction R, as shown in FIG. 1. As shown in FIG. 1, the rearward direction R is towards the handle 20, motor 80 and battery 90 and away from the nosepiece 40 and output member 50. The output member 50 is located at the front of the screwdriver 10. The collar 30 is biased rearwardly by a biasing member such as a spring.

The collar 30 is operated by a user to actuate the screwdriver 10. When the collar 30 is in the rearward position, the motor 80 is not activated, the output 50 does not rotate and the screwdriver 10 is off. The collar 30 is rotatable to three different positions. The collar 30 has a central, lock-off position in which the collar 30 is blocked from being slid forward. The collar 30 can be rotated counter-clockwise to a reverse position in which the collar 30 can be translated forward in order to actuate the screwdriver 10 and the screwdriver 10 will operate to drive the output member 50 in reverse, so as to, for example, unscrew a screw. The collar 30 is rotatable clockwise from the central, lock-off, position to a forward operation position. When the collar 30 is in the forward operation position, the collar 30 can be slid forward so that the screwdriver 10 will operate to drive the output member 50 in a forward direction, so as to, for example, drive a screw into a workpiece.

Figure 2:
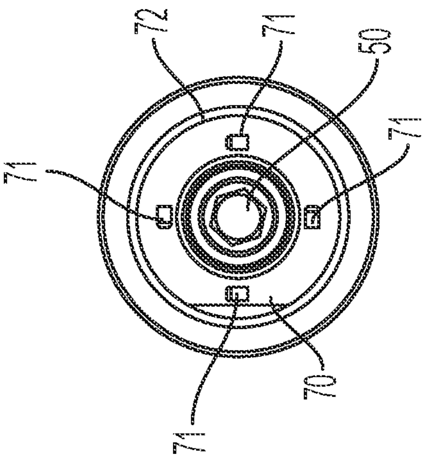
FIG. 2 is a front view of the exemplary embodiment of the screwdriver.

FIG. 2 illustrates a front view of the screwdriver 10. As shown in FIG. 2, there are four light emitting diodes (LEDs) 71 mounted on a printed circuit board (PCB) 70. The LEDs 71 illuminate an area forward of the screwdriver 10. The LEDs 71 may be covered by a lens. The lens 72 in the exemplary embodiment is transparent. The lens may be translucent, frosted, colored, curved, flat or other lens configurations.

Figure 3:
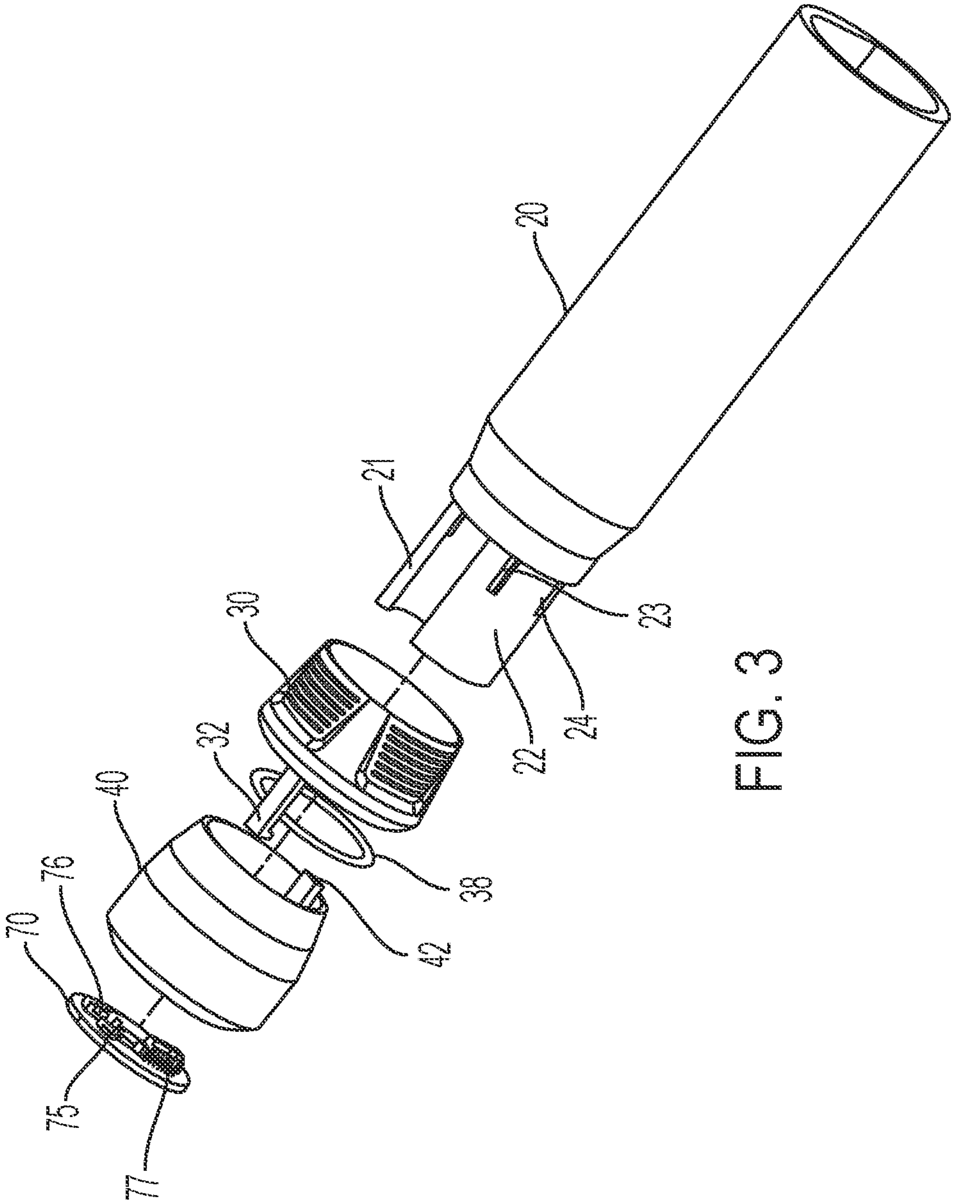
FIG. 3 is an exploded perspective view of the exemplary embodiment of the screwdriver
Figure 4:
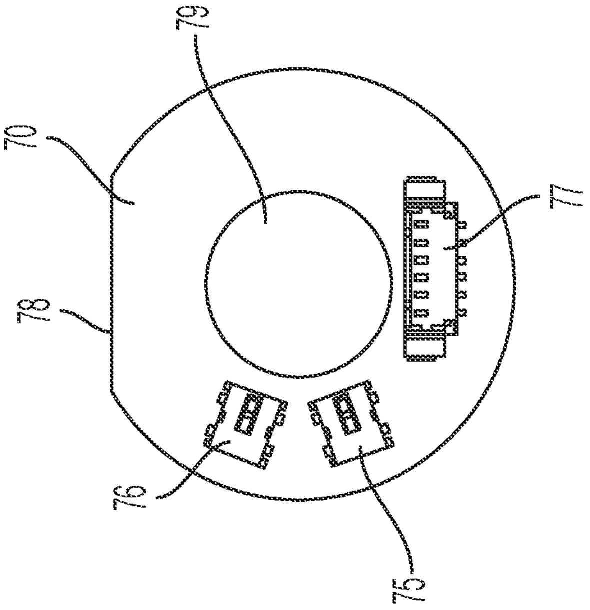
FIG. 4 is a front view of a circuit board component of the exemplary embodiment of the screwdriver.

FIG. 3 is an exploded view of selected components of the screwdriver 10. FIG. 4 is a plan view of a rear face of the PCB 70. FIG. 3 includes the body portion 20, collar 30, a spring 38, a nosepiece 40 and the PCB 70. As shown in FIG. 3, and again in FIGS. 11 and 12, the body portion 20 includes receiving projections 21 and 22. The collar 30 is received on the receiving projections 21 and 22. The collar 30 is radially outside of the receiving projections 21 and 22 and can translate along the receiving projections 21, 22 to actuate the screwdriver.

The collar 30 includes a plurality of recessed gripping portions 31 on its outer surface. The collar 30 also includes a projection 32. The projection 32 projects forward partially through the nosepiece 40 and selectively contacts microswitches 75 and 76 mounted on the PCB 70. When the projection 32 actuates the microswitch 75 by depressing the microswitch 75, the screwdriver 10 is configured to rotate in reverse. When the projection 32 actuates the microswitch 76 by depressing the microswitch 76, the screwdriver 10 is configured to rotate in a forward direction, opposite the reverse direction. The exemplary embodiment uses microswitches. In other embodiments, there may be different types of actuators such as other types of switches. The PCB 70 may also include an electrical connector port 77 for connecting the PCB 70 to the battery 90 and any controller, such as the controller 100 shown in FIG. 13. The various electrical components of the screwdriver 10 may be electrically connected by wires or other electrical connectors and the connector port 77 may be a wire harness connector. The PCB 70 is mounted in the nosepiece 40.

As shown in, for example, FIG. 4, the PCB 70 has a flat 78. The flat 78 may help with placement of the PCB 70 in the nosepiece 40 to ensure that it is located at the correct rotational location. There may be one or more other flats or location portions that are configured to ensure that the PCB 70 is installed in the correct orientation. The PCB 70 also includes a central hole 79 that allows for transmission through to the output member.

Figure 5:
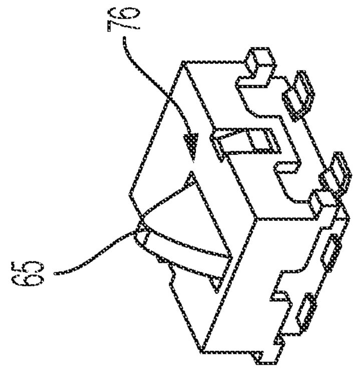
FIG. 5 is a perspective view of a microswitch component of the exemplary embodiment of the screwdriver.

FIG. 5 illustrates microswitch 75. The microswitch 75 has a movable portion 65 that is moved to actuate the microswitch 75. The microswitch 76 has the same configuration as the microswitch 75 shown in FIG. 5.

Figure 7:
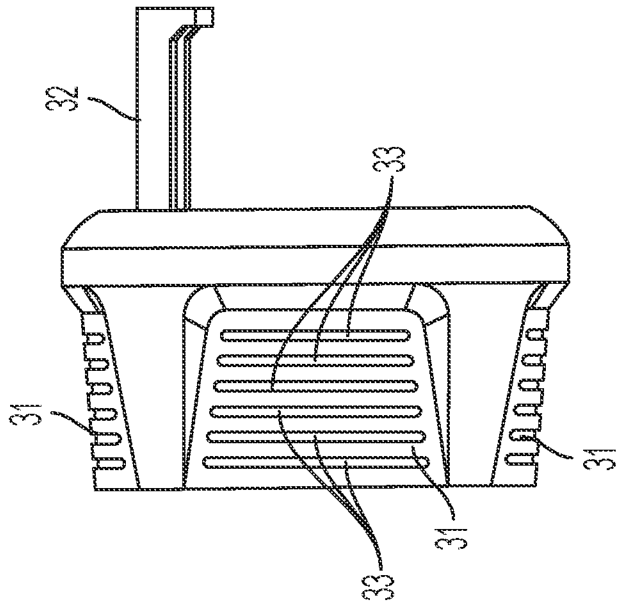
FIG. 7 is a side view of the collar component of the exemplary embodiment of the screwdriver.
Figure 6:
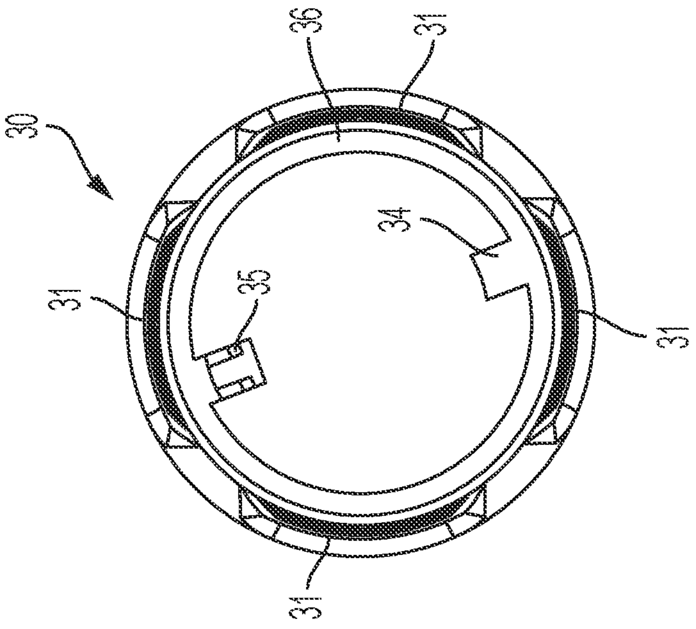
FIG. 6 is a front view of a collar component of the exemplary embodiment of the screwdriver.

FIG. 6 illustrates a front view of the collar 30 and FIG. 7 illustrates a side view of the collar 30. As shown, the collar 30 includes the previously mentioned gripping portions 31. These gripping portions 31 are recessed and assist a user in gripping and moving the collar 30. There may be various friction increasing features on the gripping portions 31. As shown in FIG. 6, the collar 30 includes two alignment projections 34, 35. These alignment projections 34 and 35 guide the collar 30 as it slides and rotates. The alignment projection 35 may be aligned with the projection 32 or integrally formed with the projection 32. The collar 30 further includes a ridge 36 for supporting a spring. The spring 38 (FIG. 3) sits between the ridge 36 and a portion of the nosepiece 40 to bias the collar 30 rearward.

Figure 10:
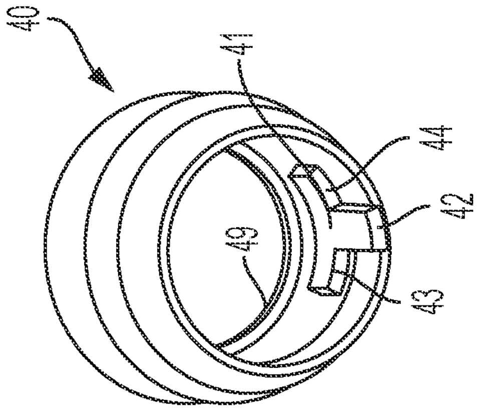
FIG. 10 is a bottom perspective view of the nosepiece component of the exemplary embodiment of a wrench.
Figure 9:
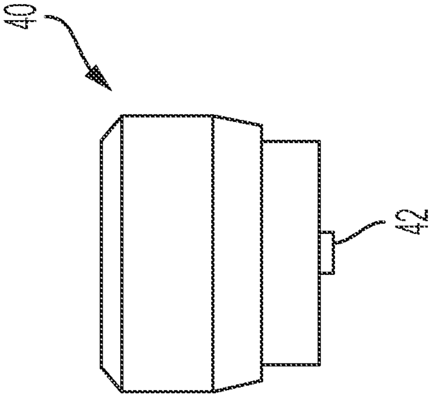
FIG. 9 is a side view of the nosepiece component of the exemplary embodiment of the screwdriver.
Figure 8:
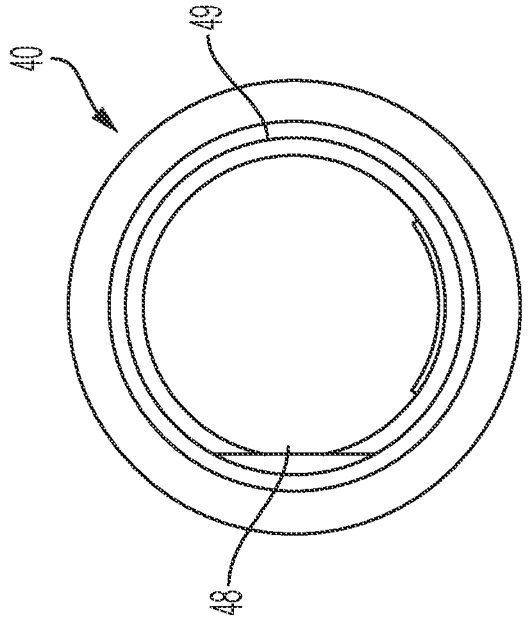
FIG. 8 is a front view of a nosepiece component of the exemplary embodiment of the screwdriver.

FIG. 8 is a front view of the nosepiece 40, FIG. 9 is a side view of the nose piece 40 and FIG. 10 is a perspective view of the nosepiece 40. The nosepiece 40, includes a flat portion 48 that corresponds with the flat 78 of the PCB 70 and allows proper placement of the PCB 70. The PCB 70 generally sits on a shoulder 49 of the nosepiece 40 near a forward end of the nosepiece 40.

The nosepiece 40 also includes a blocking piece 41. As shown in FIG. 10, the blocking piece 41 is generally "T" shaped. The blocking piece 41 blocks advancement of the collar 30. The blocking piece 41 includes three portions 42, 43 and 44, corresponding to the central, forward and reverse rotational positions of the collar 30. In the central or lock-off position, the alignment portion 34 of the collar 30 (FIG. 6) is aligned with the central blocking portion 42. When the collar 30 is in the lock-off position, if a user tries to slide the collar 30 forward, the alignment portion 34 of the collar 30 contacts the central blocking portion 42 and the collar 30 is prevented from advancing forward.

The collar 30 can be rotated clockwise to a forward operation position. In the forward operation position, the alignment portion 34 of the collar 30 (FIG. 6) is aligned with the forward blocking portion 43. When the collar 30 is in the forward operation position, the user is able to slide the collar 30 forward sufficient that the projection 32 contacts the microswitch 76 and the screwdriver 10 is actuated so that the output member 50 rotates in the forward direction. The alignment portion 34 of the collar 30 contacts the forward blocking portion 43. The forward blocking portion 43 is located to allow the collar 30 to advance sufficient for actuation of the microswitch 76, but prevents the collar 30 from advancing too far, so as to avoid damage to the microswitch 76 or PCB 70.

The collar 30 can be rotated counter-clockwise to a reverse operation position. In the reverse operation position, the alignment portion 34 of the collar 30 (FIG. 6) is aligned with the reverse blocking portion 44. When the collar 30 is in the reverse position, the user is able to slide the collar 30 forward sufficient that the projection 32 contacts the microswitch 75 and the screwdriver 10 is actuated so that the output member 50 rotates in the reverse direction. The alignment portion 34 of the collar 30 contacts the reverse blocking portion 44. The reverse blocking portion 44 is located to allow the collar 30 to advance sufficient for actuation of the microswitch 75, but prevents the collar 30 from advancing too far, so as to avoid damage to the microswitch 75 or PCB 70.

Figure 12:
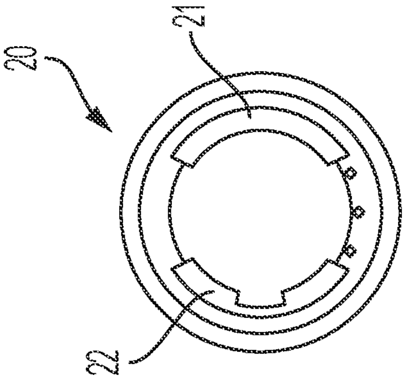
FIG. 12 is a front view of the body component of the exemplary embodiment of the screwdriver.
Figure 11:
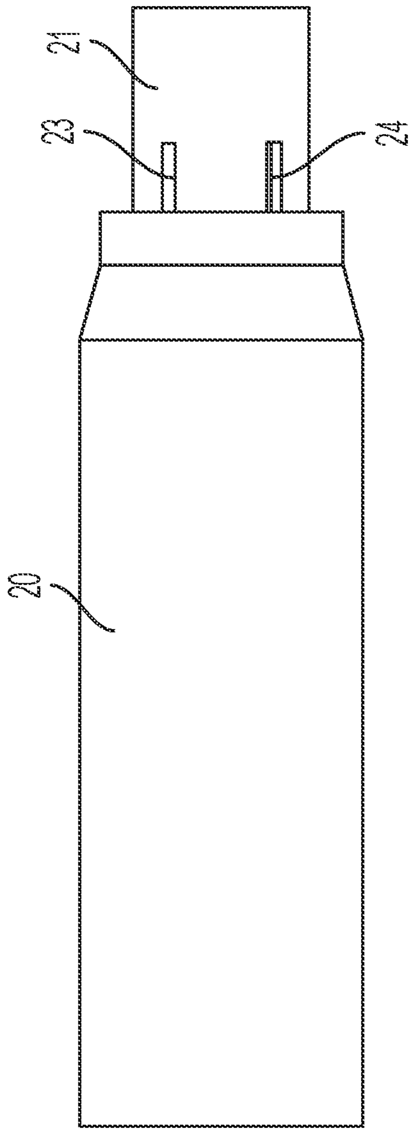
FIG. 11 is a side view of a body component of the exemplary embodiment of the screwdriver.

FIG. 11 is a side view of the body portion 20 and FIG. 12 is a front view of the body portion 20. As previously discussed, the collar 30 fits over the receiving projections 21, 22. As shown in FIGS. 3 and 11, the receiving projections 21, 22 may have grooves 23 and 24. The collar 30 may have internal projections which selectively fit into the grooves 23, 24 when the collar 30 is rotated to the lock-off, forward and reverse positions so that the collar 30 can be rotated to the appropriate position. That is, the collar 30 will be lightly secured in a lock-off position so that a user may easily rotate and keep it in the lock-off position. The grooves 23, 24 and detents may be appropriately sized to allow a user to rotate the collar 30 so that the detents may move out of the grooves. Alignment projections 34, 35 may contact ends of the projections 21, 22 to limit rotational movement of the collar 30 relative to the body. That is, the collar 30 may rotate only as the alignment projection 34 rotates from contacting one radial end of projection 21 to contacting a facing radial end of projection 22. The alignment projection 35 may operate similarly.

In other embodiments, the collar may have grooves and the body portion include detents. In other embodiments, the receiving projections 21, 22 may have various different grooves, rails, detents or other features to allow for advancement and rotation of the collar 30 the collar 30 may have corresponding grooves, rails, detents and other features to facilitate the movement.

In some embodiments, the body portion 20 may also house a transmission connected to an output of the motor. Wires and various other electrical connectors as are known in the art may be used to connect the various components of the screwdriver 10. The screwdriver 10 may also include additional circuit boards including one or more controller, memory, transmitter, receiver or other electrical components. As discussed above, although the exemplary embodiment has been described with respect to a screwdriver, exemplary embodiments of other power tools are also contemplated.

Figure 13:
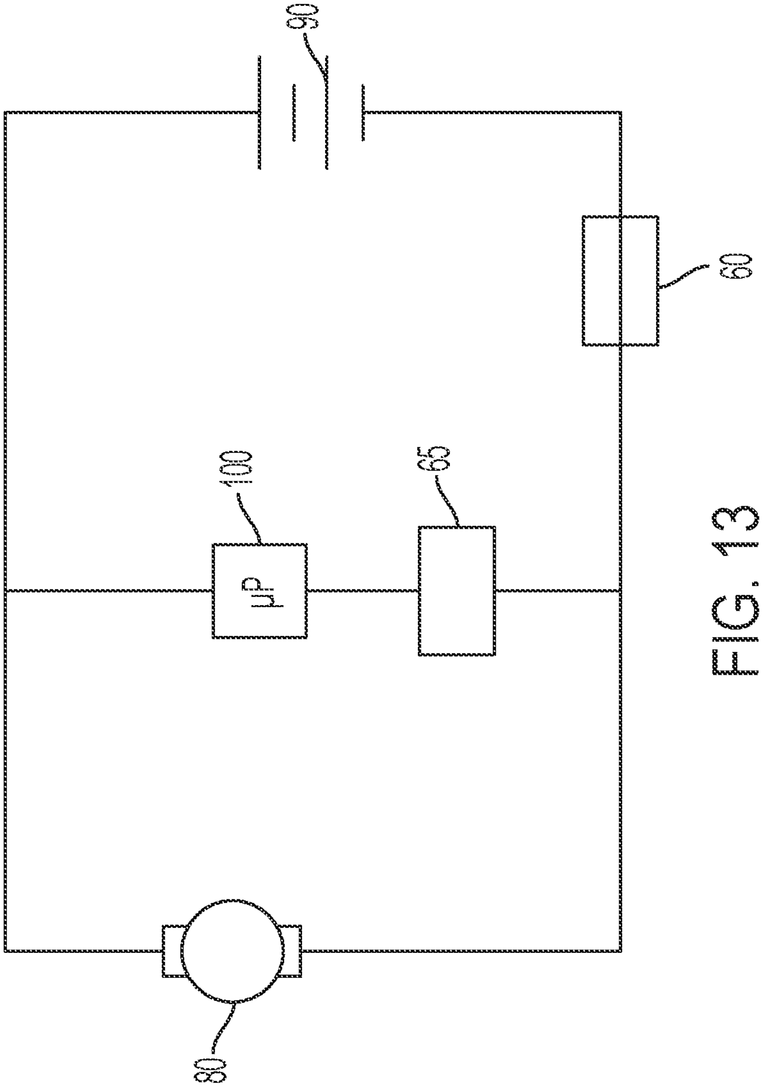
FIG. 13 is an explanatory circuit diagram.
Figure 14:
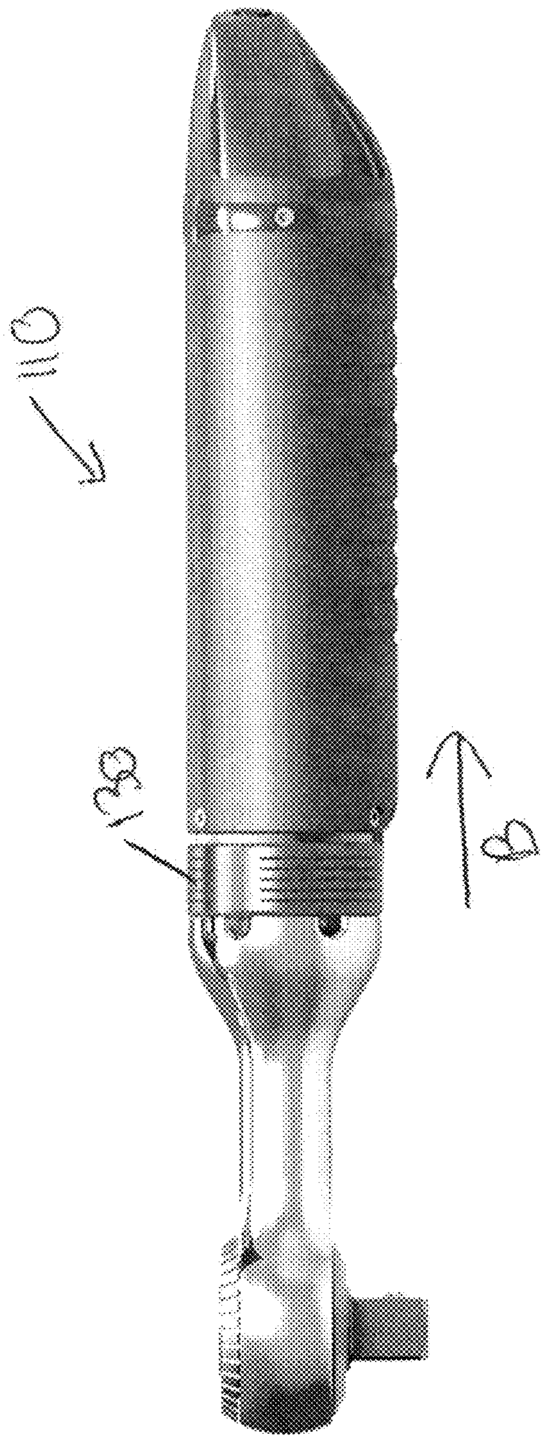
Fig. 14 PRIOR ART
FIG. 14 is an illustration of a prior art power tool collar actuator.

FIG. 13 is an explanatory circuit diagram for the screwdriver 10. As shown, the motor 80, battery 90, rotary dial 60 and microswitches 75 and 76 may be connected to a controller 100, which may be a microprocessor 100. A current sensor 65 may also be connected to the microprocessor 100. The current sensor 65 may include a resistor and may measure a motor current. Since motor current is proportional to torque, the measure of motor current by the current sensor 65 may be used to provide the torque limits mentioned above.

Although described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims It is to be understood that the present disclosure contemplates that, to the extent possible, one or more features of any embodiment can be combined or exchanged with one or more features of any other embodiment.

What is claimed is:

1. A screwdriver, comprising:
- an output member;
- a body portion forming a handle;
- a motor in the body portion and configured to selectively drive the output member;
- a battery in the body portion; and
- an actuation collar;
- wherein the actuation collar is movable relative to the body portion in a forward direction towards the output member to actuate the screwdriver; and
- wherein the actuation collar is disposed forward of the battery and rearward of the output member such that a rear end of the actuation collar is positioned forward of a rear end of the body portion.

2. The screwdriver of claim 1, further comprising a nosepiece between the actuation collar and the output member.

3. The screwdriver of claim 2, further comprising a circuit board disposed in the nosepiece.

4. The screwdriver of claim 3, further comprising an actuator on the circuit board, wherein movement of the actuation collar in the forward direction causes actuation of the actuator.

5. The screwdriver of claim 4, wherein the actuator is a microswitch.

6. The screwdriver of claim 5, wherein the collar further comprises a projection configured to selectively contact the actuator.

7. The screwdriver of claim 1, wherein the collar is rotatable to at least three positions.

8. The screwdriver of claim 7, wherein the at least three positions comprise a lock-off position, a forward operation position and a reverse operation position.

9. A power tool, comprising:
- a body forming a handle;
- a motor in the body;
- a power source in the body;
- an output member selectively driven by the motor; and an actuation collar configured to actuate the power tool;

wherein the actuation collar is rotatable between a forward operation position and a reverse operation position;

wherein in the forward operation position, the actuation collar is slidable relative to the body in a forward direction towards the output member and the power tool is actuated to drive the output member in forward rotation;

wherein in the reverse operation position, the actuation collar is slidable relative to the body in the forward direction towards the output member and the power tool is actuated to drive the output member in reverse rotation; and wherein the actuation collar is disposed rearward of the output member and forward of the motor such that a rear end of the actuation collar is positioned forward of a rear end of the body.

10. A power tool according to claim 9, wherein the actuation collar is biased away from the forward direction.

11. A power tool according to claim 9, wherein the power tool further comprises a forward operation actuator and a reverse operation actuator;

wherein the forward operation actuator is actuated when the actuation collar is slid forward when in the forward operation position.

12. A power tool according to claim 11, wherein the reverse operation actuator is actuated when the actuation collar is slid forward when in the reverse operation position.

13. A power tool according to claim 12, wherein the forward operation actuator and the reverse operation actuator are microswitches.

14. A power tool according to claim 9, further comprising a nosepiece between the body and the output member.

15. A power tool according to claim 14, further comprising a circuit board disposed in the nosepiece.

16. A power tool according to claim 15, further comprising at least one actuator mounted on the circuit board.

17. A power tool according to claim 16, wherein the at least one actuator comprises a forward operation actuator and a reverse operation actuator; and wherein the forward operation actuator is actuated when the actuation collar is slid forward when in the forward operation position.

18. A power tool according to claim 17, further the actuation collar is also rotatable to a lock-off position.

19. A power tool, comprising:

a handle;

a motor in the handle;

a power source in the handle;

an output member selectively driven by the motor; and an actuation collar movable relative to the handle in a forward direction towards the output member to actuate the power tool;

wherein the actuation collar is rearward of the output member;

wherein the actuation collar is forward of the power source; and wherein a rear end of the actuation collar is positioned forward of a rear end of the handle.

20. The power tool of claim 19, wherein the collar is rotatable to at least three positions; and wherein the at least three positions comprise a lock-off position, a forward operation position and a reverse operation position.

* * * * *